United States Patent

Noda et al.

[11] Patent Number: 4,648,887
[45] Date of Patent: Mar. 10, 1987

[54] METHOD FOR CONTROLLING ELECTROSTATIC PRECIPITATOR

[75] Inventors: Takaaki Noda; Hiroshi Terai, both of Hiratsuka, Japan

[73] Assignee: Sumitomo Heavy Industries, Ltd., Japan

[21] Appl. No.: 765,046

[22] Filed: Aug. 12, 1985

[51] Int. Cl.$^4$ ............................................. B03C 3/68
[52] U.S. Cl. ............................................. 55/2; 55/105
[58] Field of Search ............................ 55/2, 105, 139

[56] References Cited

U.S. PATENT DOCUMENTS

| 4,282,014 | 8/1981 | Winkler et al. | 55/105 |
| 4,382,805 | 5/1983 | Herklotz et al. | 55/2 |
| 4,433,281 | 2/1984 | Herklotz et al. | 55/105 X |

Primary Examiner—Kathleen J. Prunner
Attorney, Agent, or Firm—Laff, Whitesel, Conte & Saret

[57] ABSTRACT

There is disclosed a method for controlling an electrostatic precipitator which includes discharging electrodes and collecting electrodes and which is supplied with a rectified secondary high voltage from a high voltage generating apparatus connected to an AC source. The rectified secondary voltage is applied to the electrostatic precipitator by alternating an on-load period of a fixed time length corresponding to one or two cycles of the AC source and an off-load period of variable time length. In such an application of voltage, a voltage application compulsory pause period corresponding to at least 10 cycles of the AC source is provided at a suitable interval, and as a reference voltage for back ionization detection, there is detected the bottom value of the secondary voltage in the first on-load period just after each compulsory pause period. Further, there is detected the voltage of an odd-numbered bottom in each on-load period after the above compulsory pause period and until the next compulsory pause period, so as to compare the detected bottom voltage with the reference voltage and to adjust the time length of the next off-load period the time corresponding to one cycle of the AC source on the basis of the result of the comparison.

18 Claims, 15 Drawing Figures

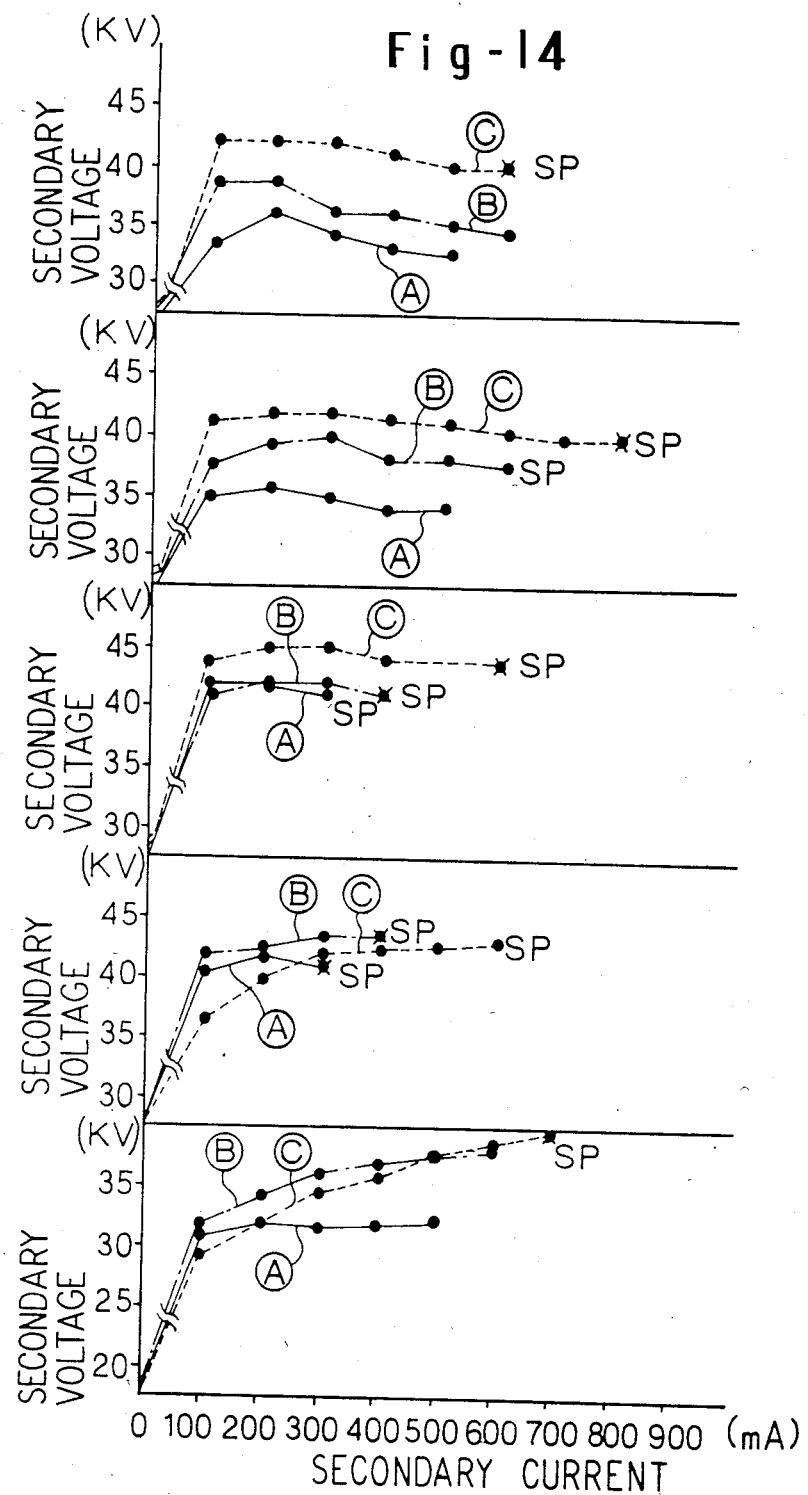

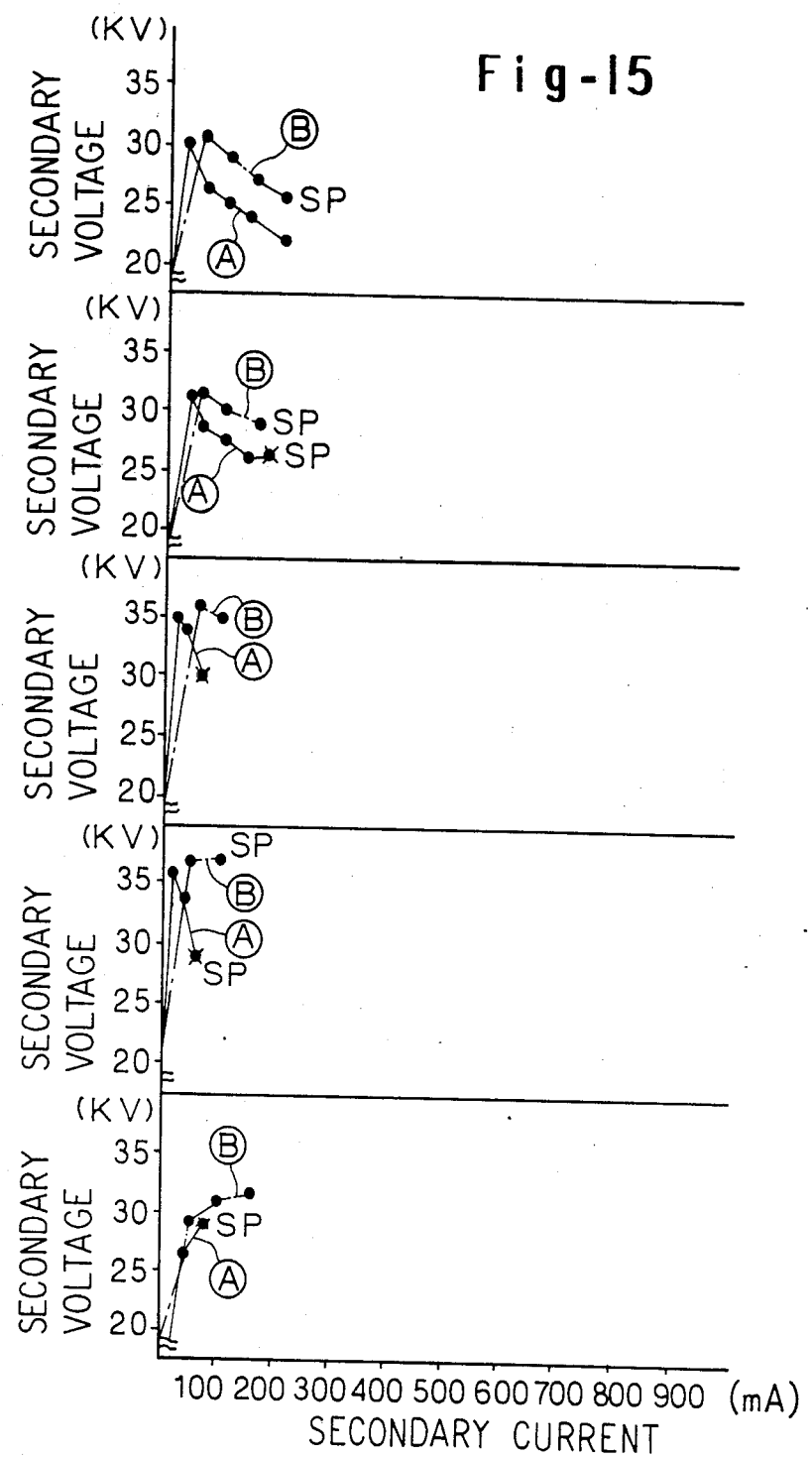

METHOD FOR CONTROLLING ELECTROSTATIC PRECIPITATOR

FIELD OF THE INVENTION

The present invention relates to a method for controlling electrostatic precipitators, and more particularly to such a method capable of effectively collecting even high resistance dust particles by alleviating any problems of "back ionization" that may arise in the collected particles.

DESCRIPTION OF THE PRIOR ART

Conventionally, the higher the voltage applied to an electrostatic precipitator's electrodes becomes, the greater the efficiency of the precipitator's dust collection. However, if the applied voltage is too high, an undesirable spark discharge will occur in the electrostatic precipitator. Because of this, electrostatic precipitators have typically been continuously run with a voltage as high as possible while taking steps to control the occurrence of sparks, particularly the frequency of sparks generated.

Nevertheless, when the particles to be collected have a high electric resistivity, a further problem of so-called "back ionization" frequently occurs. This is a problem particularly when the particles to be collected have a resistance of not less than $10^{11}$ ohm.cm or greater. When such high resistance particles are collected by a precipitator, an electric charge is increasingly stored in the layer of particles deposited on the collecting electrodes of the electrostatic precipitator. Finally, the deposited charged particle layer breaks down, with the result that a corona discharge occurs, opposite in polarity to the corona ordinarily formed on the discharge electrodes. If such back ionization takes place in the electrostatic precipitator, the applied current will inevitably increase without permitting the applied voltage to increase. Therefore, voltage-related efficiency of particle collection will be decreased. FIG. 1 shows the voltage to current characteristics at the secondary winding side of the power source for the electrostatic precipitator. It can be understood from FIG. 2 that when back ionization occurs, the applied current increases but the applied voltage does not.

For the purpose of preventing the back ionization mentioned above, Japanese Patent Laid-open Publication No. Sho 56-70859 has proposed one method for controlling an electrostatic precipitator. In this method, an electric voltage is intermittently applied between the discharge and collecting electrodes of the electrostatic precipitator by manually or automatically adjusting the frequency (repetition interval) and the duty cycle or period of voltage application. However, the most suitable frequency and duty cycle of voltage application depend upon the condition and the kind of particle-laden gas. Therefore, they are determined by experimental experience in said Japanese Patent Laid-open Publication. Because of this, although it can be theoretically said that this earlier method is very suitable for electrostatic precipitation of high resistance particles, it is very difficult to control the electrostatic precipitator at the optimum conditions for effectively carrying out this method.

In view of these circumstances, the present applicant has proposed a method for detecting back ionization, in Japanese Patent Laid-Open Publication No. Sho 58-67360, and also proposed an apparatus capable of extinguishing the back ionization by lowering the applied voltage for a predetermined period of time when back ionization is detected, in Japanese Patent Laid-open Publication No. Sho 58-55062.

Next, as background the above back ionization detecting method and the back ionization extinguishing apparatus will be explained in detail, along with their deficiencies.

(A) Control of Running Current

Referring to FIG. 2, there is shown one conventional example of a power source for an electrostatic precipitator. This power source comprises a current control circuit 10 consisting of a pair of oppositely parallel connected gate turn-off thyristors 10A and 10B controlled by a gate control circuit 12. This current control circuit 10 is connected at its one end to an AC power source through a double pole switch 14 and is also connected at its other end through a current limiting reactor 16 to a primary winding of a step-up transformer 18. This transformer 18 has a secondary winding connected to a full wave rectifying circuit 20 whose negative output terminal is connected to discharge electrodes 22 of the electrostatic precipitator. The positive terminal of the rectifying circuit 20 and collecting electrodes 24 of the electrostatic precipitator are grounded.

With such an electrostatic precipitator, the rectified voltage applied between the discharge and collecting electrodes is controlled to be maintained at a high level just before sparking occurs. The control of the voltage is carried out by adjusting the conduction angle of the thyristors 10A and 10B. By adjusting the conduction angle of the thyristors, the secondary current I can be effectively controlled, but the secondary voltage cannot be effectively controlled since the voltage-current characteristics become $dV/dI=0$ or $dV/dI<0$ for high voltages, as seen from FIG. 1, irrespective of whether or not back ionization occurs.

In order to prevent or suppress the back ionization, the thyristor switches are opened and closed so transformed secondary voltage is applied intermittently to the electrodes of the electrostatic precipitator. In such a case, the mean electrode current $I_M$ over the total period comprising an on-load period (secondary voltage applying period) $T_{ON}$ and an off-load period (voltage application pause period) $T_{OFF}$ can be expressed as follows:

$$I_M = I_{ON} \frac{T_{ON}}{T_{ON} + T_{OFF}}$$

where $I_{ON}$ is the current for the ON period.

In the above equation, the term $T_{ON}/(T_{ON}+T_{OFF})$ is called the duty cyle or ratio.

In the conventional circuit shown in FIG. 2, even if the mean current is controlled at a level just below occurrence of spark, an effective control of the spark cannot be accomplished. More specifically, if the duty cycle or ratio should vary as a result of the back ionization suppression or prevention, the mean current will of necessity also correspondingly vary. If to cope with such a situation the voltage applied is controlled to maintain the mean current at a predetermined constant value, the voltage applied during the on-load period $T_{ON}$ has to be necessarily increased, resulting in frequent occurrence of intense spark.

In conclusion, the aforementioned simple duty cycle method is not substantially effective in suppressing or preventing back ionization.

(B) Back Ionization Detection

Briefly, the method for detecting back ionization as disclosed in Japanese Patent Laid-open Publication No. Sho 58-67360 includes the steps of detecting the peak level of the secondary voltage of the transformer in the power source as shown in FIG. 2, deriving a reference voltage for detection of back ionization as a function of the detected peak voltage, comparing the reference voltage with an instantaneous value of the applied voltage after the peak voltage so as to obtain the difference in voltage, and discriminating occurrence of the back ionization on the basis of the obtained difference in voltage.

This method is a very excellent method for detection of the back ionization. However, there is two problems. First, it is very troublesome to detect the peak level of the secondary voltage and particularly to derive the reference voltage for back ionization detection from the detected peak voltage. Secondly, the purpose of ensuring the accuracy of the back ionization detection, it is absolutely necessary to precisely measure the level and waveform of the actual voltage in the electrostatic precipitator. Namely, it is a precondition to precisely measure the actual instantaneous voltage between the discharge and collecting electrodes and then to faithfully and noiselessly transfer the measured voltage signal to a control apparatus. If the precise measurement or the faithful transfer cannot be obtained, there is a large degree of possibility that, when a back ionization actually occurs, it cannot be detected, or in spite of no back ionization, there is caused such an erroneous detection that the back ionization occurs.

On the other hand, a cable for transmitting the secondary voltage for the electrostatic precipitator actually has a length of 10 to 100 m and often exceeds 100 m. In addition, the cable is often laid in proximity of high tension voltage sources and the primary winding circuit of the power sources. Because of this, the cable is apt to be subjected to various noises, particularly AC noises.

Thus, the aforementioned two problems are obstacles in actually carrying out the method of back ionization detection as disclosed in Japanese Patent Laid-open Publication No. Sho 58-67360.

In this connection, the back ionization should be detected at an initial stage in its growth. Because, if the back ionization extends over a substantial area of the collecting electrodes, a significant hindrance will be caused in the electrostatic precipitator. On the other hand, at the initial stage of the back ionization, the total area of the collecting electrode surfaces in which no back ionization occurs is overwhelmingly larger than that of the collecting electrode surfaces in which the back ionization occurs, so that the influence of the back ionization to the electrostatic precipitator voltage or current is relatively small. Therefore, it is difficult to detect the back ionization at its initial stage by monitering the precipitator voltage or current.

(C) Method for Preventing Back Ionization

Next, assuming that the back ionization is accurately detected, explanation is directed to the back ionization extinguishing method disclosed in Japanese Patent Laid-open Publication Sho No. 58-55062.

In this method, if the back ionization is detected, the application of the voltage is paused. In other words, the length of the on-load period $T_{ON}$ is from the start of the voltage application until the detection of the back ionization. On the other hand, the length of the off-load period $T_{OFF}$ is determined on the basis of the degree of the detected back ionization. However, it is very difficult to precisely estimate a required length of the off-load period in compliance with the degree of the detected back ionization.

Specifically, in the case of high resistance dust particles, the back ionization will occur immediately after application of the voltage, and will disappear after a substantial time has elapsed from the start of the off-load period $T_{OFF}$. In the case of middle resistance dust particles, the back ionization will occur when some length of time has elapsed after the start of the on-load period $T_{ON}$, and will disappear relatively quickly after the application of voltage is paused. Therefore, the optimum off-load period has to be experimentally estimated. For this purpose, it is necessary to previously accumulate a large amount of various data by actually giving various lengths of off-load periods $T_{OFF}$ when the back ionization is detected and then measuring the efficiency of dust collection in those conditions. Furthermore, optimum conditions are selected from the accumulated data, and a table of optimum off-load periods are prepared. In actual running of the electrostatic precipitator, comparison is made between the detected data of the back ionization and the previously prepared table, and an optimum off-load period is selected from the table. Such a processing is very troublesome, and needs a large scaled computer to execute the processing at real time.

However, even the above method is yet not sufficient to operate the electrostatic precipitator without substantially harmful influence of the back ionization. Specifically, in the case of the electrostatic precipitator being used for dust particle laden gas exhausted from coal burning boiler, the condition for the back ionization generation is dependent upon the temperature of the gas and the kind of coal being burned, and also is influenced by non-uniformity of coal in the same kind of coal and the condition of the particles deposited on the collecting electrode surfaces (for example, the thickness of the deposited particle layer, the amount of residual ions in the deposited particle layer, etc.). Therefore, it is not possible, and very difficult even if possible, to perfectly estimate the condition for generation of back ionization.

In addition, the electrostatic precipitator ordinarily comprises a plurality of series-connected stages, so that the particles contained in the gas are gradually removed each time the particle laden gas passes through the respective stages of the precipitator. Therefore, the dust particles deposited on the collecting electrodes in each stage exert influences different from those in the other stages.

Therefore, in order to obtain the maximum efficiency of collection, each time the kind of coal and/or the other running conditions for the boiler are changed, it is required to adjust control parameters for the electrostatic precipitator at each stage in response to the dynamically changing conditions of the dust particles and the precipitator caused by the change of the running condition for the boiler.

As seen from the above, the determination of the off-load period $T_{OFF}$ based on the experience can provide some degree of dust collection efficiency, but cannot provide the maximum efficiency since it cannot provide the optimum control parameters in compliance with the ceaselessly dynamically varying running conditions of the dust generating source such as the coal burning boiler. Therefore, in order to actually obtain the maximum dust collection efficiency, the operator for the electrostatic precipitator has to readjust the control parameters to the optimum values at each time of change of the coal kind and the other running conditions. This gives a large load to the operator in respect to acquisition of parameter adjusting technique and the actual operation for adjusting the control parameters.

SUMMARY OF THE INVENTION

Accordingly, it is one object of the present invention to provide a method for controlling an electrostatic precipitator, free from the aforementioned inconveniences in the prior art.

Another object of the present invention is to provide a method for controlling an electrostatic precipitator, which can be carried out without dependency upon experiences.

A still another object of the present invention is to provide a method for controlling an electrostatic precipitator, in which the back ionization can be simply and surely detected without dependency upon experiences and irrespectively of the dynamically varying conditions for the electrostatic precipitator.

A further object of the present invention is to provide a method for controlling an electrostatic precipitator, in which even dust particles of high resistance can be collected at the maximum efficiency in a simple manner while preventing back ionization.

In the course of investigation for the above and other objects of the present invention, the inventors of the present inventions have paid their attention to the fact that in the case of high resistance dust particles, if a voltage is continuously applied to the precipitator for a long time, the back ionization will occur in the deposited particle layer on the collecting electrodes of the precipitator. In view of this fact, the inventors have conceived that a voltage is intermittently applied to an electrostatic precipitator by maintaining the time length of each on-load period $T_{ON}$ at the length corresponding to one or two cycles of an AC power source and on the other hand by varying the time length of off-load period $T_{OFF}$ dependently upon the degree of the back ionization.

In addition, the inventors have found that when the back ionization occurs a so-called "bottom value" of the secondary voltage is lowered. In view of this, and in order to more accurately detect the back ionization, the inventors have also conceived to compulsorily produce a condition in which no electric charge remains in the deposited dust particle layer, and then, to detect a first bottom value of the secondary voltage in the application of voltage to the electrostatic precipitator just after the chargeless condition has been produced, so as to use the bottom value as a reference voltage for detection of back ionization.

The present invention has been completed as the result of study based on the aforementioned two conceptions.

Namely, according to the present invention there is provided a method for controlling an electrostatic precipitator which includes discharging electrodes and collecting electrodes and which is applied with a voltage from a high voltage generating apparatus connected to an AC source, comprising the steps of: applying a voltage to the electrostatic precipitator by alternating a on-load period of a fixed time length corresponding to one or two cycles of the AC source and a off-load period of variable time length; putting at a suitable interval a voltage application compulsory pause period corresponding to at least 10 cycles of the AC source; detecting, as a reference voltage for back ionization detection, the bottom value of the secondary voltage in the first on-load period just after each compulsory pause period; detecting the voltage of a odd-numbered bottom in each on-load period after the above compulsory pause period and until the next compulsory pause period and comparing the detected bottom voltage with the reference voltage; and adjusting the time length of the next off-load period the time corresponding to one cycle of the AC source on the basis of the result of the comparison. Specifically, the adjustment of the time length of the off-load period is carried out by elongating the next off-load period the time corresponding to one cycle of the AC source when the detected bottom voltage is lower that the reference voltage, and shortening the next off-load period the time corresponding to one cycle of the AC source when the detected bottom voltage is not lower than that of the reference voltage.

Herein, the "bottom value" means a minimum value of the secondary voltage during each half cycle of the AC source current. Specifically explaining with reference to FIG. 3 which shows a waveform of the secondary voltage, the bottom value $V_B$ designates the secondary voltage of the point which is about to rise up again after it falls down from the peak level $V_P$.

As seen from the above, one cycle of the AC source current is made as one minimum unit for the voltage on-load period $T_{ON}$ and the off-load period $T_{OFF}$ in the control method in accordance with the present invention. In other words, the length of the periods $T_{ON}$ and $T_{OFF}$ is integer time the length corresponding to one cycle of the AC source current. In the secondary voltage, a pair of peak $V_P$ and bottom $V_B$ appear in each half-cycle of the AC source current, and therefore, it can theoretically said that it is possible to control the voltage application at each half-cycle. However, in the present invention, the control is made with a minimum unit of one cycle for the purpose of discriminting odd-numbered and even-numbered bottoms for the reason which will be explained below in detail.

As mentioned hereinbefore, it is difficult to perfectly remove the AC noise from the secondary voltage. However, the polarity of the AC noise superimposed on the secondary voltage is reversed at each half-cycle, as seen from FIG. 4, which shows a waveform of the secondary voltage containing the AC noise. Accordingly, each bottom value is extremely different from adjacent one. Therefore, if attention is directed to only odd-numbered bottoms, since the noise in each odd-numbered bottom is the same in polarity, a true change of the bottom value can be watched so as to perform accurate detection of the back ionization.

For the reason mentioned above, in the case of each on-load period having only one cycle of the AC source current, the value of the first bottom in the first on-load period just after the compulsory pause period is sampled and held as the reference voltage for back ionization detection. In the case of each on-load period having two cycles of the AC source current, the value of the first or third bottom is sampled. In such a case, however, since both the first and third bottom values contain noises, it is preferable to hold a higher one of the first and third bottom values as the reference voltage for the back ionization detection. In fact, the noise contained in the third bottom is less than that contained in the first bottom, and therefore, only the third bottom may be sampled and held as the reference voltage for the back ionization detection.

In the method of the present invention, furthermore, when the detected bottom value is smaller than the reference voltage for back ionization detection, it is judged that the back ionization occurs. Preferably, it is judged that the back ionization occurs when the detected bottom value is smaller than a level which is smaller than the reference voltage by a predetermined extent such as 1 to 10% of the reference voltage.

In addition, in the case that the on-load period has the time length corresponding to two cycles of the AC source current, since the noise contained in the third bottom voltage is less than that of the first bottom voltage as mentioned above, it is preferable that the third bottom voltage is sampled in each voltage application period and then compared with the reference voltage for back ionization detection.

In the aforementioned method for controlling the electrostatic precipitator in accordance with the present invention, the off-load period $T_{OFF}$ is automatically determined in accordance with the steps of the present invention. In the case of gas containing dust particles of low resistance, since back ionization hardly occurs, the off-load period $T_{OFF}$ would be gradually shortened one cycle by one cycle, and would finally become zero so that the continuous application of the voltage is realized.

On the other hand, in the case of high resistance dust particles, the off-load period is shortened and elongated in response to the occurrence situation of back ionization, but in any case an intermittent application of voltage will be maintained. Specifically, in case of frequent occurrence of the back ionization, the off-load period is gradually elongated, resulting in intermittent voltage application of a small duty ratio, and on the other hand, in case of less occurrence of back ionization, the off-load period is gradually shortened, with the result that the intermittent voltage application can be realized at a duty ratio as high as possible while maintaining such a condition that there is substantially zero or slight occurrence of back ionization. In this connection, the maximum and minimum lengths of the off-load period may be beforehand determined.

Thus, according to the method of the present invention for controlling the electrostatic precipitator, the dust collection can be carried out at a possible maximum efficiency without dependency upon any experience while simply, effectively and surely preventing the back ionization in compliance with the dynamically varying situation of the electrostatic precipitator.

The above and other objects, features and advantages of the present invention will be apparent from the following description of preferred embodiments of the invention with reference to the accompanying drawings.

BRIEF DESCRIPTION OF THE DRAWINGS

FIGS. 14 and 15 are graphs showing the relation between the secondary voltage and the secondary current in respective stages of an actual 5-stage electrostatic precipitator.

DESCRIPTION OF THE PREFERRED EMBODIMENTS

Figure 1:
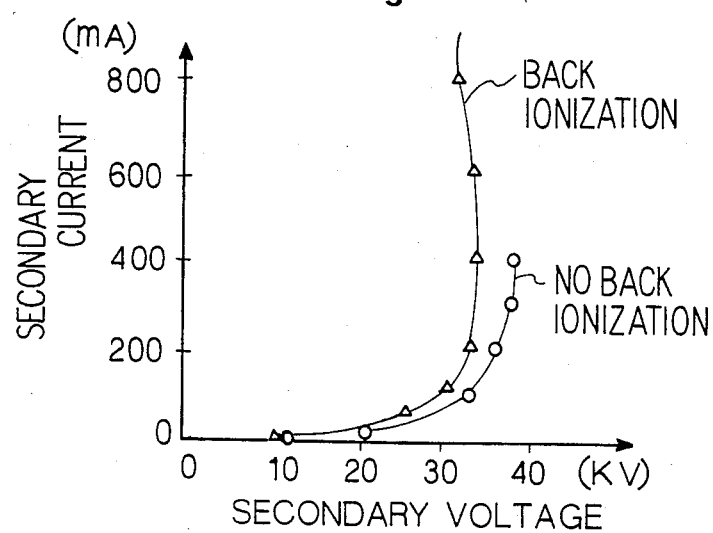
FIG. 1 is a graph showing the relation between the secondary current and the secondary voltage in an electrostatic precipitator when back ionization occurs and when back ionization does not occur.
Figure 2:
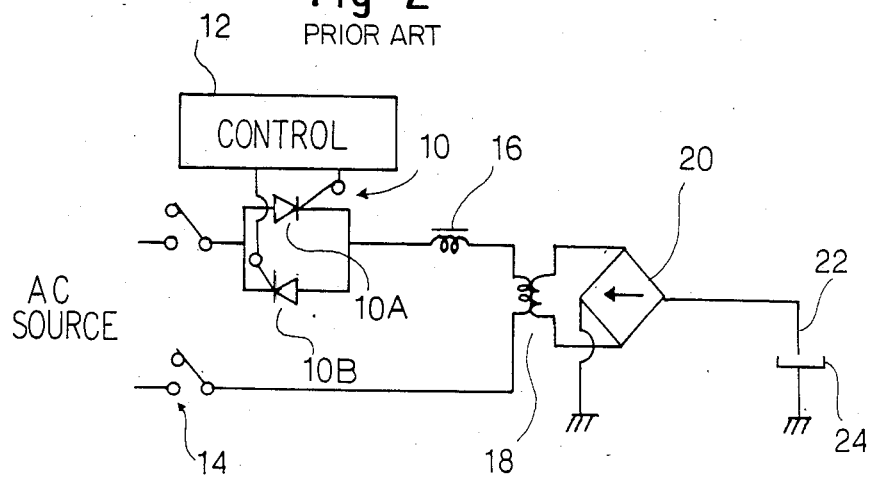
FIG. 2 is a block diagram of a conventional power source for the electrostatic precipitator.
Figure 3:
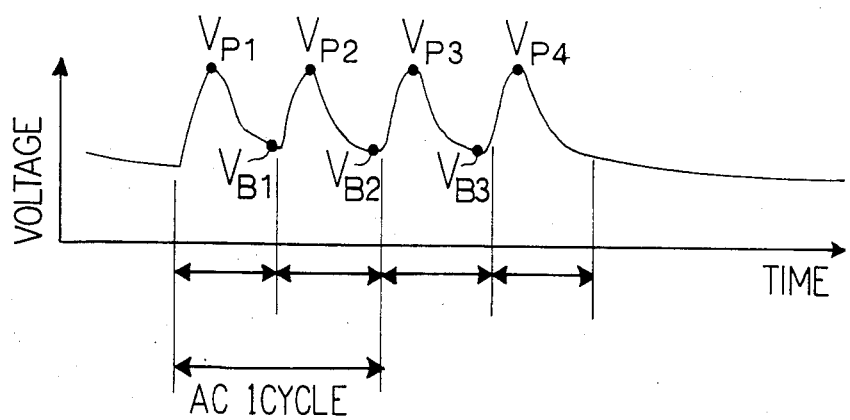
FIG. 3 shows a typical waveform of the secondary voltage in the conventional electrostatic precipitator.
Figure 4:
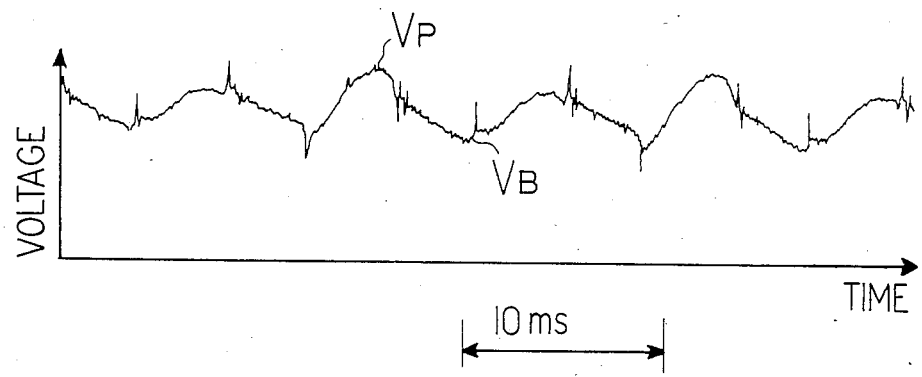
FIG. 4 shows an actual waveform of the AC noise containing secondary voltage in the electrostatic precipitator.
Figure 5:
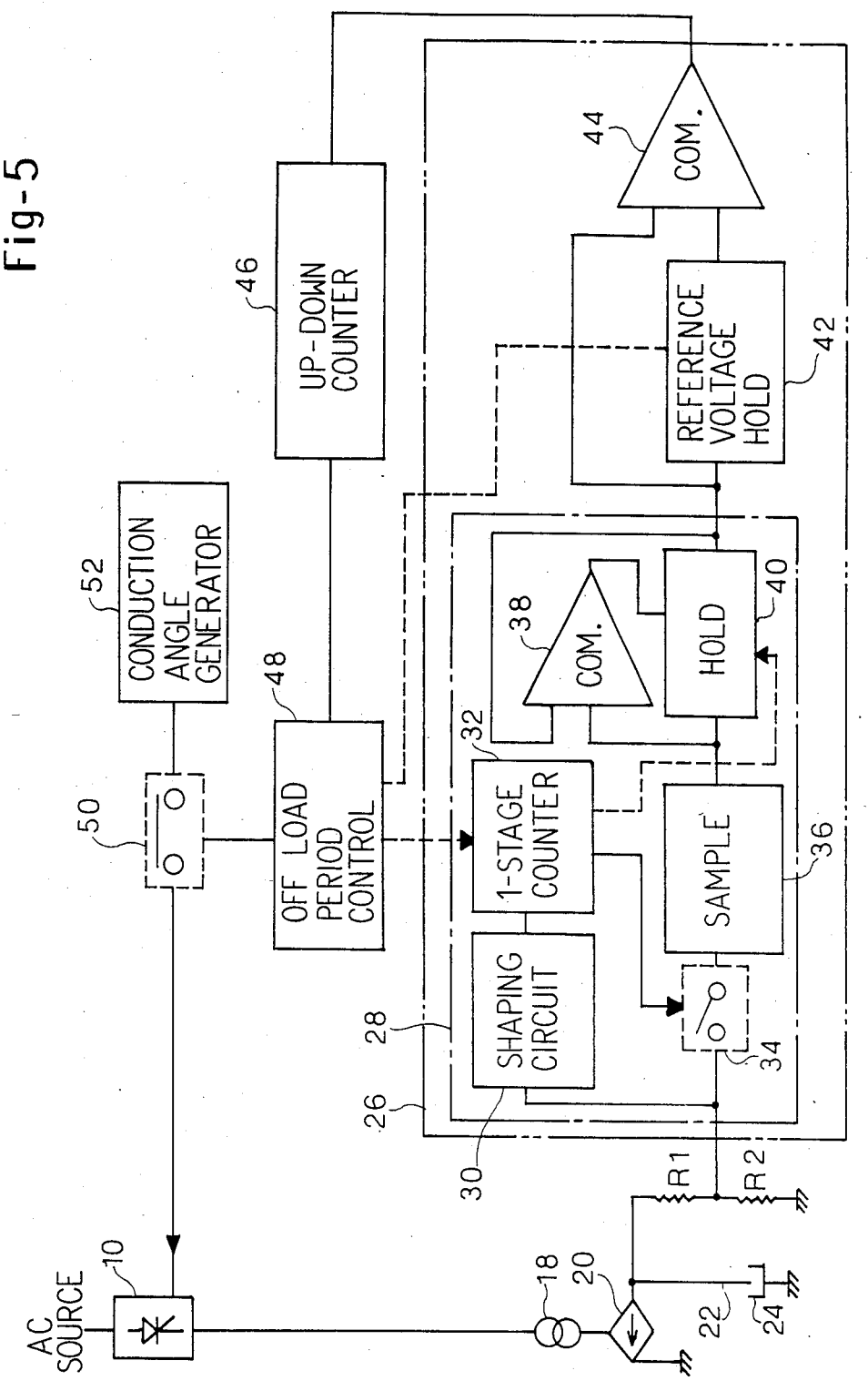
FIG. 5 is a block diagram showing one embodiment of a power source associated to the electrostatic precipitator used for carrying out the method of controlling the electrostatic precipitator in accordance with the present invention.

Referring to FIG. 5, there is shown a block diagram of the power source used for carrying out the electrostatic precipitator controlling method in accordance with the present invention. The power source comprises a current control circuit 10 connected at its input to an AC power source and at its output through a step-up transformer 18 to an rectifier circuit 20. This rectifier circuit 20 has a negative terminal connected to discharge electrodes 22 of an electrostatic precipitator, and a positive terminal grounded together with collecting electrodes of the electrostatic precipitator.

In addition, the discharge electrodes 22 of the electrostatic precipitator are connected to the ground through a series circuit consisting of resistors $R_1$ and $R_2$. The connection node between the resistors $R_1$ and $R_2$ is connected to an input of a back ionization detecting circuit 26.

The back ionization detecting circuit 26 comprises a bottom value detecting circuit 28 which is constructed for example as shown in FIG. 5. Namely, it includes a waveform shaping circuit 30 having an input connected to the connection node between the resistors $R_1$ and $R_2$. This shaping circuit 30 operates to output to a one-stage counter 32 a pulse at each peak of the secondary voltage inputted thereto. Since the counter 32 is of one stage, the logical level of the output is changed at each inputted pulse from the logical "low" to the logical "high" and vice versa. Therefore, the output of the counter 32 is brought into the logical "high" at odd-numbered inputted pulses such as a first pulse, a third pulse, etc. Incidentally, this one-stage counter 32 is cleared at the beginning of each on-load period by an off-load period controller 48 explained hereinafter.

The output of the counter 32 is connected to a control input of a gate circuit 34 which is for example constituted of an analog switch. This gate circuit 34 has an input connected to the connection node between the resistors $R_1$ and $R_2$, and an output connected to a sampling circuit 36. This gate circuit 34 is adapted to be turned on when the logical "high" signal is applied to its control input and to be turned off when the logical "low" signal is applied. Therefore, only the secondary voltage only in the odd-numbered half cycles is inputted to the sampling circuit 36.

The sampling circuit 36 is driven to sample the inputted signal at a sampling frequency extremely higher than the frequency of the AC source current. An output of the sampling circuit 36 is connected to one input of a comparator 38 and an input of a hold circuit 40. Another input of the comparator 38 is connected to an output of the hold circuit 40. The comparator 38 operates to output a hold signal to a control input of the hold circuit 40 when the output voltage of the sampling circuit 36 is smaller than the output of the holding circuit 40, so that the hold circuit 40 clears its hold voltage and newly holds the output voltage of the sampling circuit 38. Accordingly, the sampling circuit 36, the comparator 38 and the hold circuit 40 constitute a bottom hold circuit. Incidentally, the hold circuit 40 is cleared at the leading edge of the first logical "high" signal from the one-stage counter 32 during each on-load period. Thus, the bottom value detecting circuit 28 detects and holds the minimum level of the secondary voltage during each on-load period.

An output of such a bottom value detecting circuit 28 is connected to a circuit 42 for holding a reference voltage for back ionization detection and one input of another comparator 44. This reference voltage hold circuit 42 is controlled by the off-load period controller 48 explained hereinafter to hold the output voltage of the hold circuit 40 just after the completion of each compulsory pause period, until the next load pause period starts.

Thus, the comparator 44 compares the reference voltage held in the hold circuit 42 with the bottom value outputted from the bottom value detecting circuit 28. In case of the on-load period having the length of one cycle of the AC source current, when the output voltage of the bottom value detecting circuit 28 is smaller than a level which is smaller than the reference voltage held in the holding circuit 42 by a predetermined extent such as 1 to 10 percent of the reference voltage, the comparator 44 outputs a count-up signal to an up-down counter 46. To the contrary, when the output voltage of the bottom value detecting circuit 28 is equal or higher than the above voltage (which is smaller than the voltage held in the holding circuit 42 by the above predetermined extent), the comparator 44 outputs a count-down signal to the up-down counter 46.

In the case of the on-load period having the length of two cycles of the AC source current, when both or either one of the first and third bottom values outputted from the bottom value detecting circuit 28 is smaller than a level which is smaller than the reference voltage held in the holding circuit 42 by a predetermined extent, the count-up signal is outputted to the up-down counter 46. On the other hand, when both the first and third bottom values are higher than the above level which is slightly smaller than the voltage held in the holding circuit 42, the count-down signal is outputted.

The up-down counter 46 has an output connected to the off-load period controller 48. This controller 48 assumes that one count of the counter 46 corresponds to one cycle period of the AC source current, and operates to turn off a switch 50 which is connected between a current control circuit 10 and a conduction angle signal generator 52, for a period of time corresponding to the count value of the counter 46. Then, after such an off-load period, the controller 48 turns on the switch 50 for a period of time corresponding to one or two cycles of the AC source current.

Furthermore, at each predetermined time interval of for example 5 minutes, the off-load period controller 48 operates to maintain the switch 50 in an off condition for a period of time corresponding to ten cycles of the AC source current (0.2 seconds in case of a commercial AC source of 50 Hz) or more, so that a compulsory pause period is put in place of the ordinary off-load period.

Thus, the aforementioned power source for the electrostatic precipitator operates for example as follows:

After each compulsory pause period which corresponds to the ten cycles of the AC source current and which is given at each time interval of 5 minutes, the off-load period control circuit 48 turns on the switch 50 for the period of time corresponding to two cycles of the AC source current. As a result, the conduction angle signal is fed from the generator 52 through the closed switch 50 to the current control circuit 10, so that the circuit 10 is rendered conductive for a time period determined by the conduction angle signal. Accordingly, a high tension voltage is applied between the discharge electrodes 22 and the collecting electrodes 24 of the electrostatic precipitator. At that time, the one-stage counter 32 is cleared at the beginning of the on-load period by the off-period controller 48, and the reference voltage holding circuit 42 has already been cleared at the beginning of the off-load period.

The secondary voltage is picked up at the connection node of the resistors $R_1$ and $R_2$ and is fed to the waveform shaping circuit 30 which then outputs a pulse signal to the one-stage counter 32 at each peak of the inputted secondary voltage. Since the one-stage counter 32 has already been cleared as mentioned above, the output of the counter 32 is rendered to the logical "high" level at the first pulse signal from the shaping circuit 30, so that the gate switch 34 is turned on so as to allow the secondary voltage at the node between the resistors $R_1$ and $R_2$ to be applied to the input of the sampling circuit 36. At the same time, the hold circuit 40 is cleared at the leading edge of the logical "high" signal from the counter 32.

The sampling circuit 36 operates to sample the inputted secondary voltage at the predetermined sampling frequency and then output the sampled voltages to the comparator 38 and the holding circuit 40.

The comparator 38 and the holding circuit 40 cooperate in the manner mentioned above so as to detect and hold the bottom value of the inputted secondary voltage. The bottom value is fed and held in the holding circuit 42 for the reference voltage of back ionization detection, which is controlled by the off-load period controller 48 to store or hold the input voltage in the on-load period just after each compulsory pause period.

At the second peak of the secondary voltage, the shaping circuit 30 also outputs the pulse signal to the one-stage counter 32. As a result, the output of the counter 32 is brought into a logical "low" level, and therefore, the switch 34 is turned off. Accordingly, the secondary voltage succeeding to the second peak is not applied to the sampling circuit 36. Namely, the second bottom value of the secondary voltage is not detected, and the holding circuit 40 continues to hold the first bottom value of the secondary voltage.

At the third peak of the secondary voltage, the shaping circuit 30 outputs the pulse signal to the one-stage counter 32 so as to bring the output of the counter 32 to the logical "high" level, again. At the same time, the hold circuit 40 is also cleared. Therefore, the secondary voltage is fed through the switch 34 to the sampling circuit 36, and the third bottom value is detected by cooperation of the comparator 38 and the hold circuit 40 and then held in the hold circuit 40.

The third bottom value outputted from the bottom value detecting circuit 28 is fed to the comparator 40 where it is compared with the reference voltage held in the hold circuit 42. Now assuming that the bottom value is smaller than the level which is smaller than the reference voltage one (to ten) percent of the reference voltage, the comparator 44 outputs the count-up signal to the up-down counter 46.

At the fourth peak of the secondary voltage, the output of the one-stage counter 32 is again rendered to the logical "low" level. Therefore, similarly to the duration the second and third peaks of the secondary voltage, the hold circuit 40 continues to hold the third bottom value.

Thus, the off-load period controller 48 turns off the switch 50 at the end of the on-load period of the time corresponding to two cycles of the AC source current. Then, the up-down counter 46 has been incremented one count, and the controller 48 maintains the switch 52 in the off condition for the time of the cycle number corresponding to the count value of the counter 46.

After the off-load period has been terminated, the off-load period controller 48 turns on the switch 52 for the time period corresponding to the two cycles of the AC source, and at the same time, clears the one-stage counter 32. Therefore, the conduction angle signal is again fed from the generator 52 through the closed switch 50 to the current control circuit 10, so that the current control circuit 10 is rendered conductive in accordance with the conduction angle inputted. Therefore, a high tension voltage is again applied to the electrostatic precipitator.

The secondary voltage is picked up at the node between the resistors $R_1$ and $R_2$ and is fed to the waveform shaping circuit 30, which in turn outputs a pulse signal to the one-stage counter 32. Then, since the one-stage counter 32 has already been cleared, the output of the counter 32 is rendered to the logical "high" level at the first pulse signal from the shaping circuit 30, so that the gate switch 34 is turned on so as to allow the secondary voltage at the node between the resistors $R_1$ and $R_2$ to be applied to the input of the sampling circuit 36. The shaping circuit 30 operates to sample the inputted secondary voltage at the predetermined sampling frequency and then output the sampled voltages to the comparator 38 and the holding circuit 40.

The comparator 38 and the holding circuit 40 cooperate to detect and hold the bottom value of the inputted secondary voltage. The bottom value is fed to the comparator 40 where it is compared with the reference voltage held in the hold circuit 42. At that time, assuming that the bottom value is not smaller than the level which is smaller than the reference voltage by one (to ten) percent of the reference voltage, the comparator 44 outputs neither the count-up signal nor the count-down signal to the up-down counter 46.

At the second peak of the secondary voltage, the shaping circuit 30 also outputs the pulse signal to the one-stage counter 32. Accordingly, the output of the counter 32 is brought into a logical "low" level, and therefore, the switch 34 is turned off. As a result, the secondary voltage succeeding to the second peak is not applied to the sampling circuit 36, and the holding circuit 40 continues to hold the first bottom value of the secondary voltage.

At the third peak of the secondary voltage, the shaping circuit 30 outputs the pulse signal to the one-stage counter 32 so as to bring the output of the counter 32 to the logical "high" level, again. At the same time, the hold circuit 40 is also cleared. Therefore, the secondary voltage is fed through the switch 34 to the sampling circuit 36, and the third bottom value is detected by cooperation of the comparator 38 and the hold circuit 40 and then held in the hold circuit 40, similarly to the processing carried out from the first to the second peaks of the secondary voltage.

The third bottom value is fed to the comparator 44 and is compared with the reference voltage held in the holding circuit 42. At that time, if the third bottom value is smaller than the level which is smaller than the reference voltage by one (to ten) percent of the reference voltage, the comparator 44 outputs the count-up signal to the up-down counter 46. When the bottom value is to the contrary, the comparator 44 outputs the count-down signal to the up-down counter 46.

In the manner mentioned above, the counter 46 is counted up and down, and the voltage is intermittently applied to the electrostatic precipitator with the off-load period of the cycle number corresponding to the counter value of the counter 46.

As is apparent from the above description of the embodiment, in the electrostatic precipitator controlling method in accordance with the present invention, there is imposed the compulsory pause periods corresponding to ten or more cycles of the AC commercial source.

During each compulsory pause period, the back ionization will perfectly disappear, and therefore, in an on-load period just after the compulsory pause period, the voltage is applied to the electrostatic precipitator in no back ionization condition. Therefore, the bottom value $V_B$ has a relatively high voltage in the first on-load period. By using the high bottom value $V_B$ as the reference voltage for discriminating the back ionization, a highly reliable detection of back ionization can be realized.

After the compulsory pause period, if the length of the off-period is gradually shortened at each off-period, the bottom value $V_B$ in the respective on-periods having the fixed time length corresponding to one or two cycles will be gradually decreased. The inventors have found out that the off-period of the length capable of maintaining the bottom value $V_B$ in each on-load period at a level smaller than the reference voltage, is optimum for preventing the back ionization and at the same time for obtaining the collection efficiency as high as possible.

Figure 6:
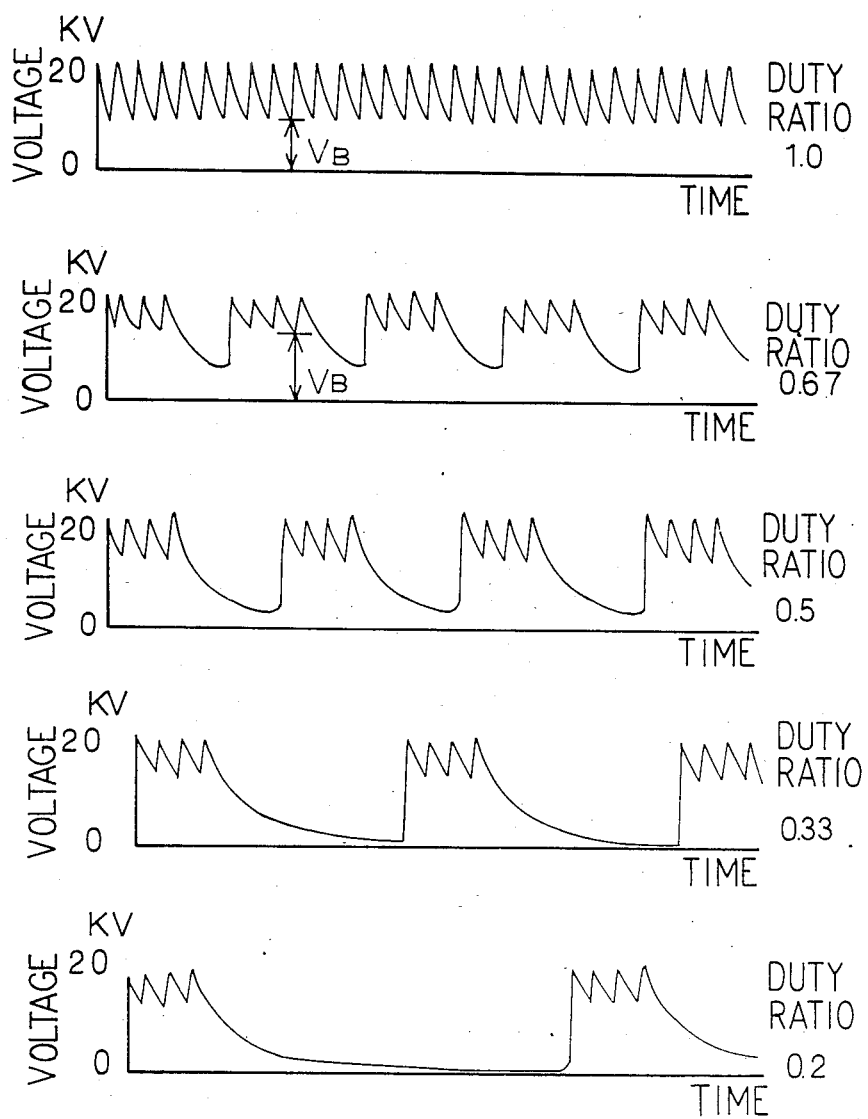
FIGS. 6 to 11 respectively show the secondary voltages at various duty ratios.
Figure 7:
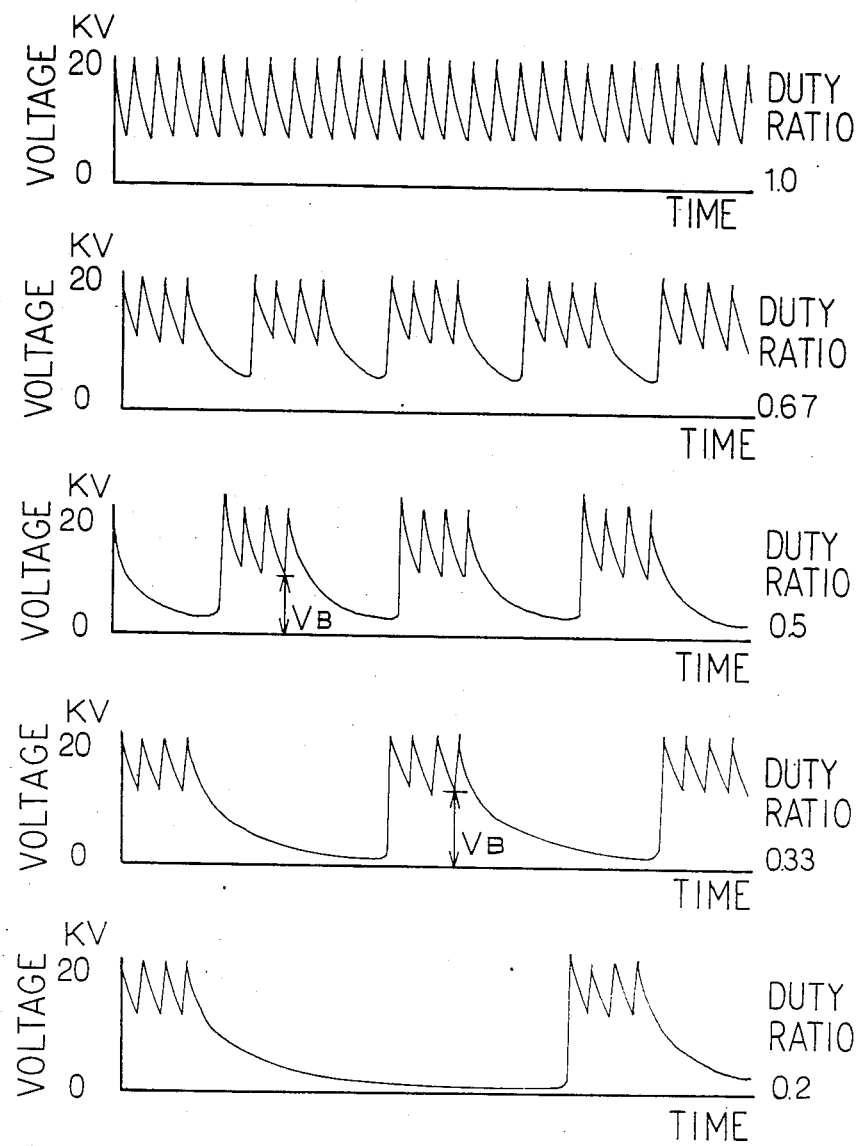
Figure 8:
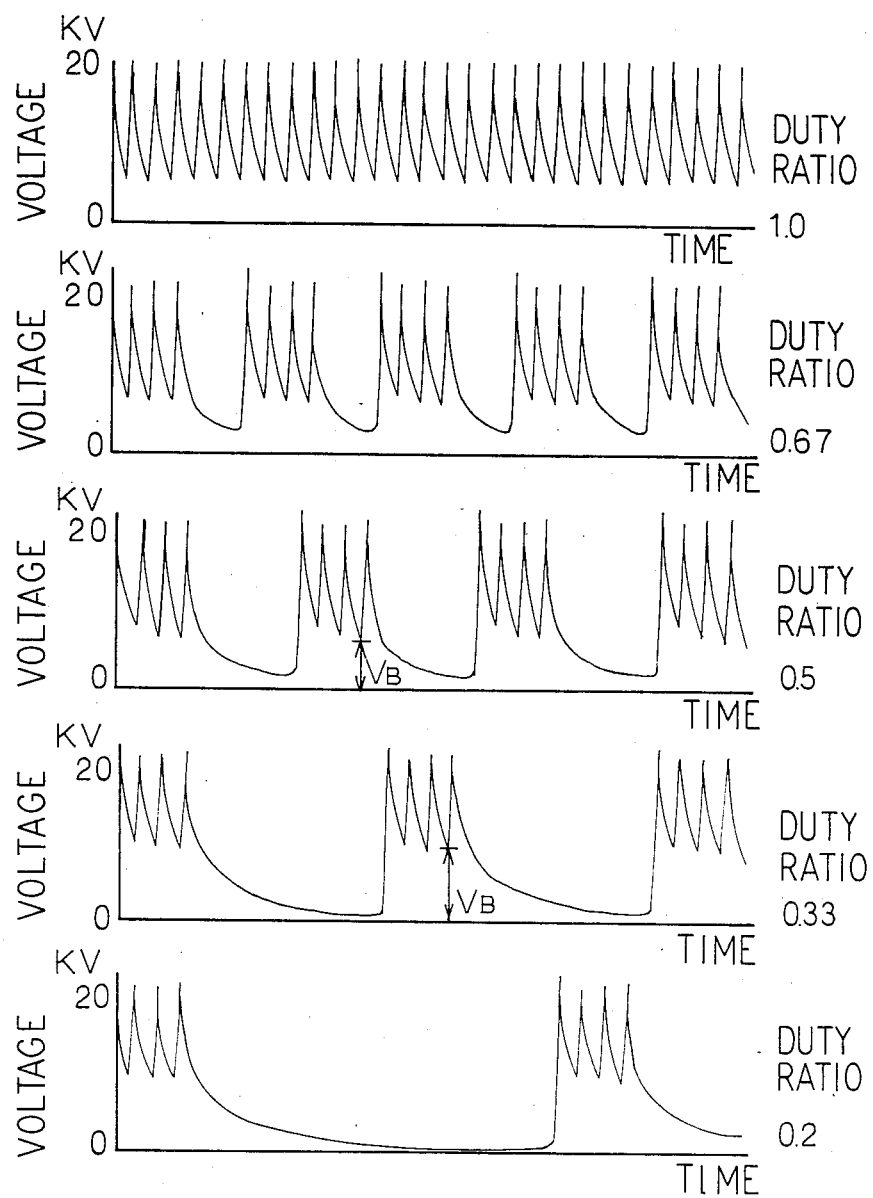
Figure 9:
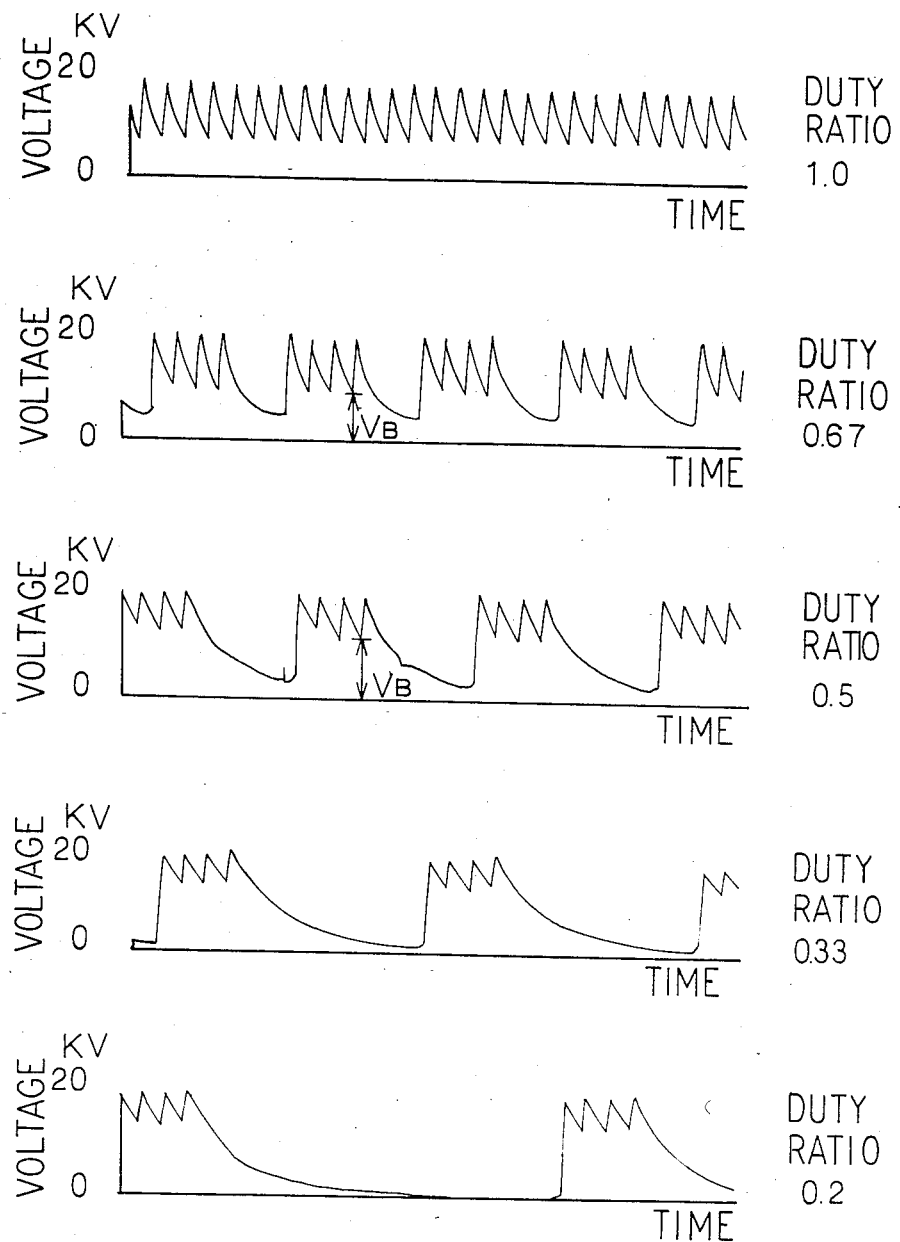
Figure 10:
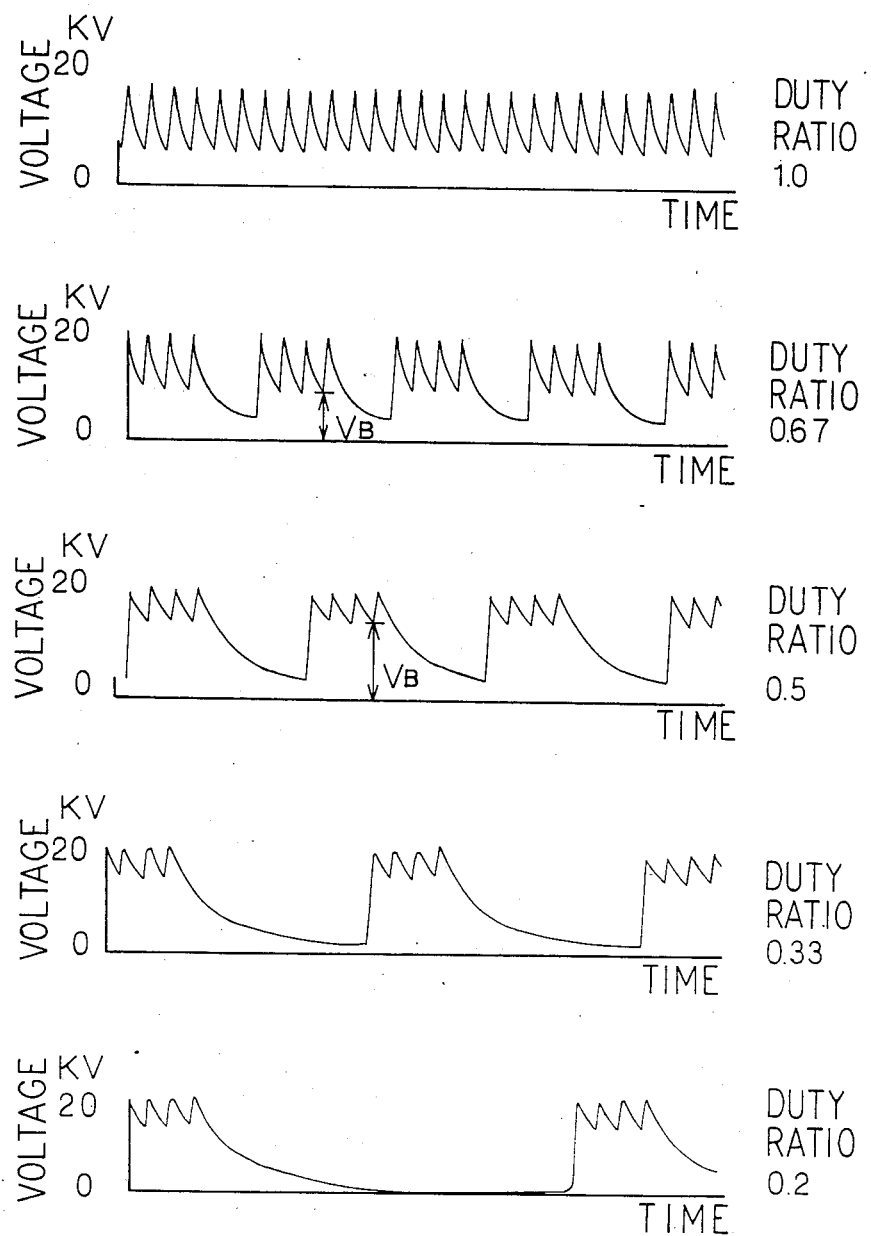
Figure 11:
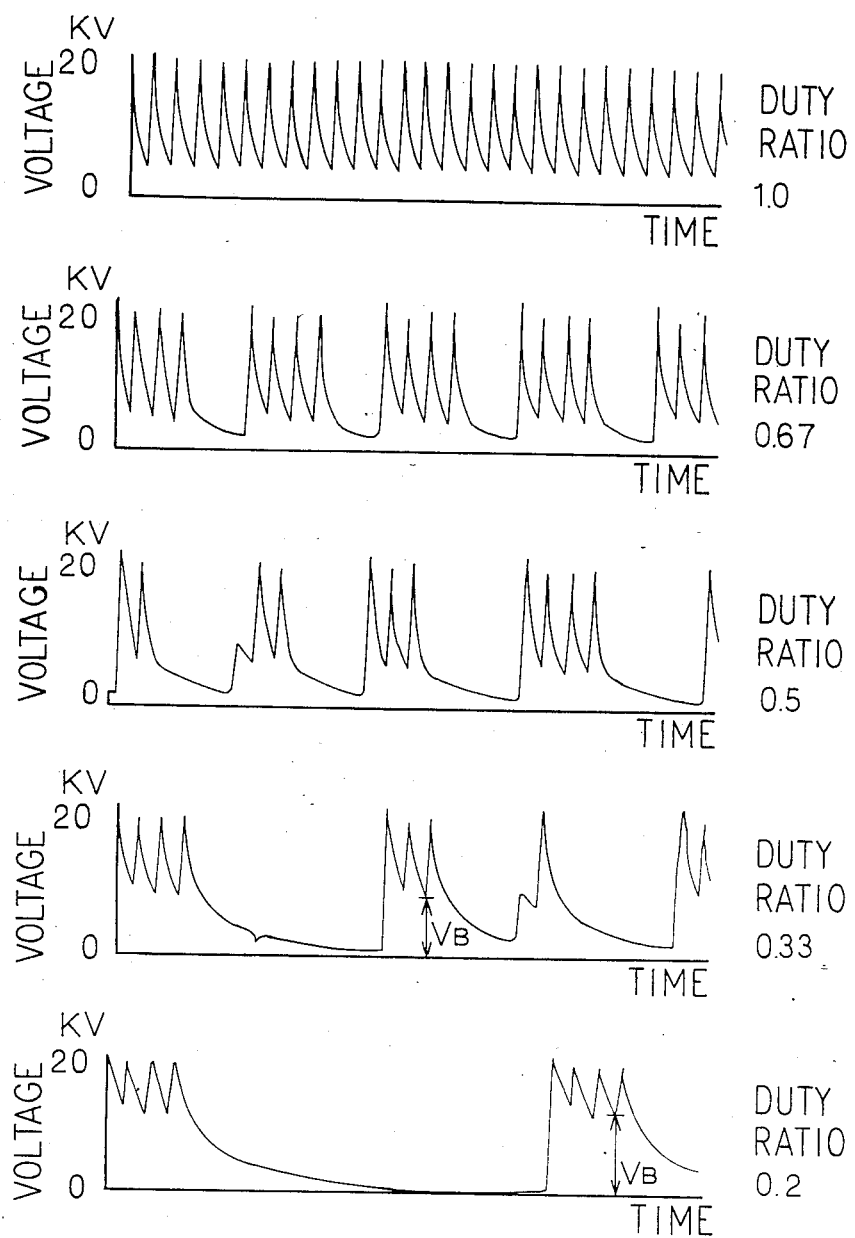

Referring to FIGS. 6 to 11, there are shown secondary voltage waveform in various tests obtained by changing the length of the off-load period. Specifically, FIGS. 6, 7 and 8 show the secondary voltage of the same electrostatic precipitator when it is operated to remove fly ash generated by burning coal produced in Japan, and FIGS. 9, 10 and 11 show data when fly ash generated by burning coal produced abroad is removed by the same electrostatic precipitator. In addition, the mean current $I_{ON}$ during each on-load period is increased in the order to FIGS. 6, 7 to 8 and also in the order of FIGS. 9, 10 and 11. Furthermore, the five graphs of each Figure show in the order of top to bottom the following cases:

| | |
|---|---|
| Duty Ratio = 1.0 | (on-load period = 2 cycles off-load period = 0) |
| Duty Ratio = 0.67 | (on-load period = 2 cycles off-load period = 1 cycle) |
| Duty Ratio = 0.5 | (on-load period = 2 cycles off-load period = 2 cycles) |
| Duty Ratio = 0.33 | (on-load period = 2 cycles off-load period = 4 cycles) |
| Duty Ratio = 0.2 | (on-load period = 2 cycles off-load period = 8 cycles) |

Examining the odd-numbered bottom values $V_B$ in FIGS. 6 to 11, in particular the third bottom values $V_B$, when the duty ratio is relatively small, the bottom value $V_B$ is high in all FIGS. 6 to 11, but, when the duty ratio exceeds a certain value, the bottom value is suddenly decreased. The borderline duty ratio from which the bottom value starts to suddenly decrease is as follows:

In FIG. 6, Duty Ratio=1.0
In FIGS. 7 and 8, Duty Ratio=0.5
In FIGS. 9 and 10, Duty Ratio=0.67
In FIG. 11, Duty Ratio=0.33

In any case, even if the duty ratio is made higher than the borderline duty ratio, the efficiency of dust collection is not improved because of back ionization, and only consumption of power is uselessly increased. On the other hand, if the duty ratio is decreased below the borderline level, the efficiency of dust collection is extremely decreased because of shortage of applied power. Therefore, the borderline duty ratio is the optimum duty ratio and the length of the off-load period corresponding to the borderline duty ratio is the optimum length of the off-load period.

Figure 12:
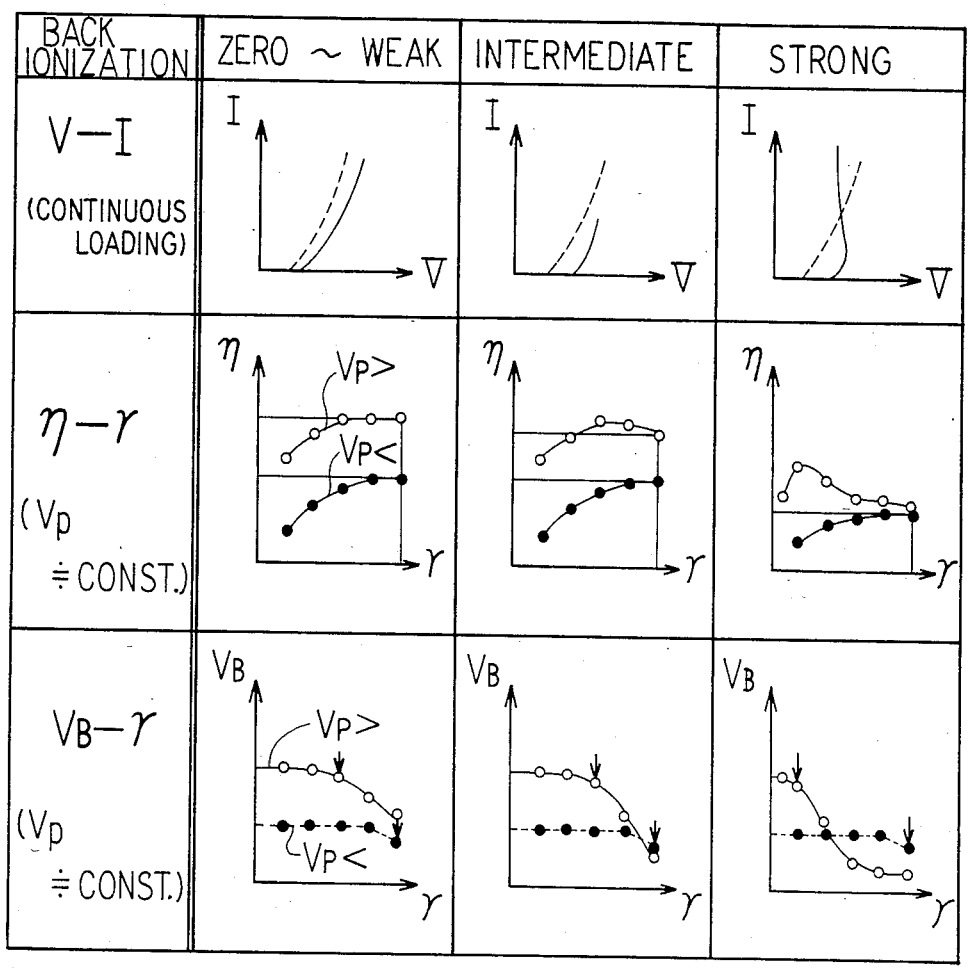
FIG. 12 shows actual various characteristics of the electrostatic precipitator at various conditions.

In view of the above, the inventors have performed tests at various condition and then measured the actual efficiency of dust collection. FIG. 12 shows the result of the tests in a summarized form. In FIG. 12, the extent of the back ionization is divided into three regions, namely, a zero or weak back ionization region, an intermediate back ionization region, and a strong back ionization region. In addition, the upper column shows the secondary current to secondary voltage characteristics in the case of continuous voltage loading, where the axis of ordinate shows the secondary current and the axis of abscissa shows the secondary voltage. The solid lines indicate the case of dust particle laden gas being supplied to the electrostatic precipitator, and the dotted lines show the case in which no-dust gas is flowed through the electrostatic precipitator.

The middle column of FIG. 12 shows the relation between the collection efficiency $\eta$ and the duty ratio $\gamma$ at a constant peak voltage $V_P$ of the secondary voltage, where the ordinate axis shows the collection efficiency and the abscissa axis shows the duty ratio. In addition, the white-dot-and-line shows the case of high peak voltage $V_P$ and the black-dot-and-line shows the case of low peak voltage $V_P$.

The lower column of FIG. 12 shows the relation between the bottom value $V_B$ and the duty ratio $\gamma$ at a constant peak voltage $V_P$ of the secondary voltage, in which the ordinate axis shows the bottom value and the abscissa axis shows the duty ratio. The white-dot-and-line shows the case of high peak voltage $V_P$ and the black-dot-and-line shows the case of low peak voltage $V_P$. In addition, a arrow is given to each curve at a point where the bottom voltage $V_B$ starts to drop when it gradually increased from a sufficiently low value.

Totally examining FIG. 12, the collection efficiency shows a peak at the value of the duty ratio indicated by the arrow. In other hand, if the electrostatic precipitator is driven at the duty ratio indicated by the arrow, it is possible to obtain a maximum dust collection efficiency at a small consumption of power, i.e., without no useless consumption of power. Such a control of duty ratio can be automatically carried out in accordance with the method of the present invention, so that a maximum collection efficiency can be automatically obtained irrespectively of various conditions of a dust laden gas, the kind of the dust contained in the gas, and condition of the electrostatic precipitator itself.

Figure 13:
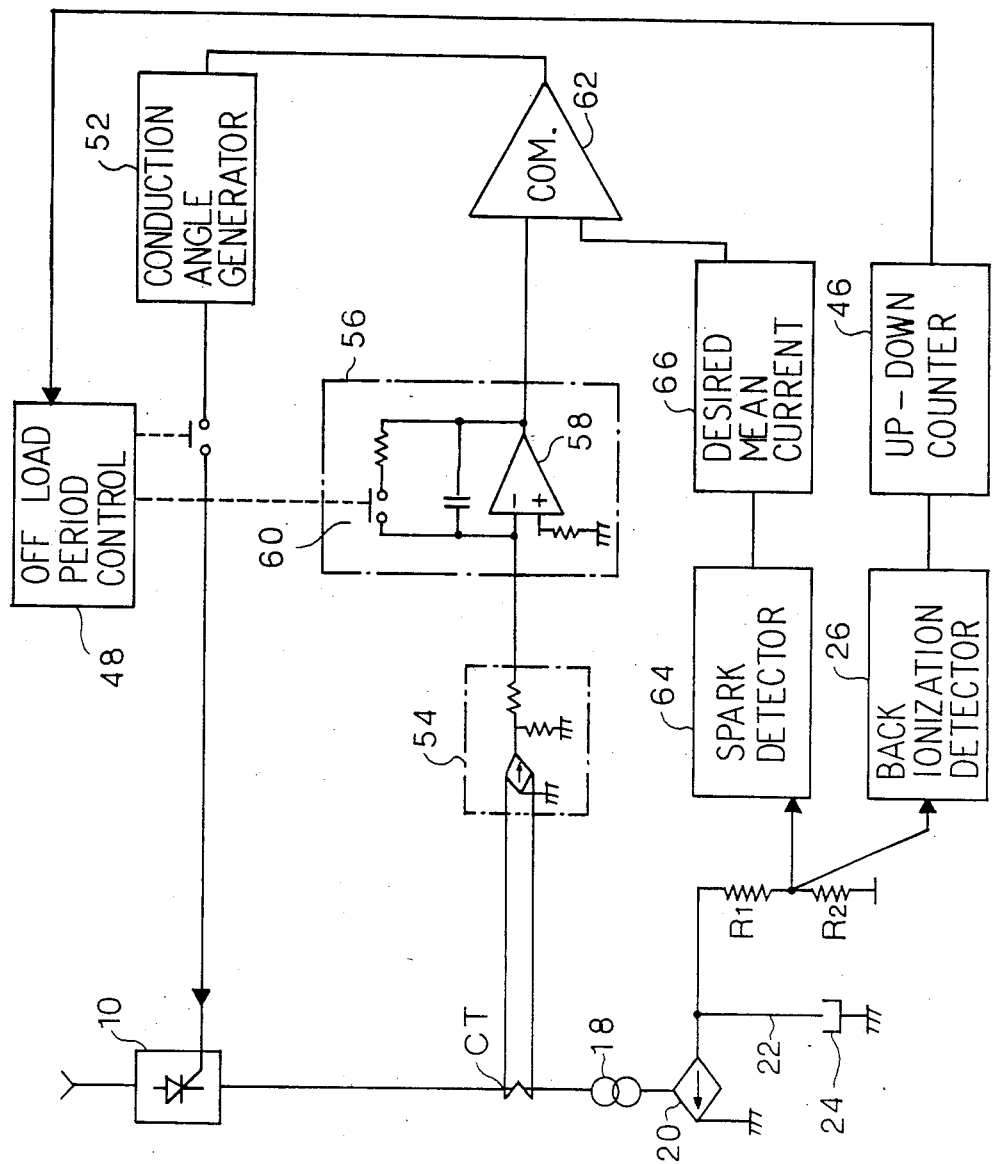
FIG. 13 is a view similar to FIG. 5 but showing another embodiment of the control circuit for the power source.

Referring to FIG. 13, there is shown in the form of a block diagram, another embodiment of the apparatus for controlling the electrostatic precipitator in accordance with the method of the present invention. In FIG. 13, elements and circuits similar to those of the apparatus shown in FIG. 5 are given the same Reference Numerals, and then, explanation on those elements and circuits will be omitted.

The controlling apparatus shown in FIG. 13 comprises two control loops, a first loop of which is intended to control the mean current $I_{ON}$ in the on-load period (which substantially corresponds to the aforementioned peak voltage $V_P$ in the on-load period), and the other loop is intended to control the length of the off-load period on the basis of the back ionization detection. The second loop is constructed similar to the apparatus shown in FIG. 5, and therefore, explanation will be made on only the first control loop.

This first control loop comprises a current transformer CT provided on a power line between the current control circuit 10 and the step-up transformer 18. The current transformer CT has an output connected to an absolute value circuit 54 which is constructed of for example a rectifier circuit. An output of the absolute value circuit 54 is connected to an input of a mean value circuit 56, which is adapted to average the absolute value voltage of the primary current of the power source in each on-load period and then to output the mean current $I_{ON}$. But, the mean current $I_{ON}$ may be obtained from the secondary current of the power source.

For example, the mean value circuit 56 comprises a differential amplifier 58 having an output and an inverted input interconnected by a parallel circuit of a resistor R and a capacitor C. The resistor R is connected in parallel to the capacitor through a solid state switch 60, which is controller 48 so that it is turned on only during the on-load period. Therefore, during the on-load period, the circuit 56 operates as the mean value circuit having the time constant determined by the capacitor C and the resistor R. On the other hand, during the off-load period, since the switch 60 is maintained in the off condition, the capacitor C operates to hold its voltage. Thereafter, when the switch 60 is turned on again, the mean value circuit 56 again starts its averaging function and outputs a new mean current $I_{ON}$ to one input of a comparator 62.

Furthermore, the node between the resistors $R_1$ and $R_2$ is connected to a spark detector 64 whose output is connected to a desired mean current value circuit 66. The spark detector 64 is adapted to generate one pulse at each spark, and the desired value circuit 66 operates to increase or decrease the desired mean current value on the basis of the number of pulses per unit time from the spark detector 64 (which number corresponds to the number of sparks generated per unit time), the desired mean current value is adjusted at a level immediately before generation of sparks. For example, if the number of sparks is increased, the desired means current value is lowered, and to the contrary, if the number of sparks is decreased to substantially zero, the desired value is increased.

An output of the desired value circuit 66 is connected to the other input of the comparator, which is also connected at its output to an input of the conduction angle signal generator 50. When the actual mean current is smaller than the desired value outputted from the circuit 66, the conduction angle signal generator 50 generates the signal of an increased conduction angle, and on the other hand, when the actual mean current is larger than the desired value, the generator 50 generates the signal of an decreased conduction angle.

Accordingly, the apparatus shown in FIG. 13 operates to control the mean current at a level immediately before generation of spark by means of the first control loop as explained just above, and at the same time to control the duty ratio at a possible maximum value within the extent of no back ionization occurrence, by means of the second control loop similar to the apparatus shown in FIG. 5.

The change in the duty ratio caused by the second loop would be disturbance to the first control loop. For example, if the situation of spark occurrence is greatly changed by such disturbance, a good control cannot be realized. However, both the controls are actually compatible without becoming a substantial disturbance to each other. For example, if the duty ratio is decreased with a constant mean current $I_{ON}$, the peak level $V_P$ of the secondary voltage during the on-load period is sometimes increased slightly. The reason for this is considered that since the back ionization becomes hard to generate, a higher voltage can be applied. However, generation of sparks is in no way facilitated because of such an increase of voltage applied. On the other hand, since the duty ratio is controlled by changing only the length of the off-load period while maintaining the on-load period at the fixed length, the mean current $I_{ON}$ is not influenced by the change of the duty ratio unless the duty ratio is extremely and abruptly changed.

Referring to FIGS. 14 and 15, there are shown secondary voltage to secondary current characteristics of an actual 5-stage electrostatic precipitator. In each of FIGS. 14 and 15, a lowermost graph shows a first dust collection room of the electrostatic precipitator; a penultimate graph shows a second dust collection room; third and forth graphs third and fourth rooms; and a uppermost graph a fifth room.

In addition, FIG. 14 shows the case of the duty ratio=1 (continuous loading) and FIG. 15 shows the case of the duty ratio=0.2 (on-load period=1 cycle and off-load period=4 cycles). Furthermore, the curve labelled "A" shows the case of high resistance coal-burned ash being supplied to the electrostatic precipitator; the curve labelled "B" shows the case of intermediate resistance coal-burned ash; and the curved labelled "C" shows the case of a low resistance coal-burned ash. Points SP indicate generation of spark. The axes of abscissa in FIGS. 14 and 15 respectively indicate mean currents over the on-load period plus the off-load period. Therefore, the mean current $I_{ON}$ during the on-load period can be obtained by multiplying the current value in FIG. 15 by 5. Now, if there is derived from FIG. 15 the mean current $I_{ON}$ when a spark occurs, it would be noted that the derived mean current $I_{ON}$ will be relatively near to the secondary current value in FIG. 14 when the spark occurs. Namely, the values of the mean current $I_{ON}$ just before generation of the spark are not dependent upon the duty ratio. This means that if generation of sparks is controlled by changing the mean current $I_{ON}$, it is possible to prevent the influence of disturbance by the change of the duty ratio. However, if the generation of spark is controlled by changing, instead of the current $I_{ON}$, the mean current over the on-load period plus the off-load period, since the mean current over the total period is changed by change in the duty ratio, the intended control cannot be realized.

In the case of actually carrying out the method of the present invention, it is preferable to settle the upper limit of the off-load period length, for the purpose of preventing shortage of electric charges in the electrostatic precipitator, which shortage would be caused for very long off-load period and would lead to extreme decrease of the collection efficiency.

Furthermore, it is also preferable to settle the lower limit of the off-load period length. In the case of dust particles in which no back ionization will occur, the maximum efficiency of collection can be obtained when the off-load period becomes zero (See FIG. 12). If the precipitator is controlled in accordance with the method of the present invention, the off-load period will be rendered zero in the case of dust particle property mentioned above. However, such dust particles can be easily collected in the electrostatic precipitator. On the other hand, the electrostatic precipitator should be designed to collect at a predetermined efficiency of collection even dust particles which is not so easy to be removed. Therefore, it is allowable to decrease the efficiency of collection to some extent in the case of collecting dust particles which do not cause the back ionization. Accordingly, it is advisable to maintain the off-load period even in the case of such dust particles for the purpose of energy saving.

In addition, if the lower limit of the off-load period length is settled, the power source for the electrostatic precipitator is not required to have the same rating as that required when continuous voltage loading is performed. For example, if the mean current $I_{ON}$ is 1000 mA at maximum, the internal impedance of the power source and the current limiting reactor should be so designed that a current of 1000 mA is instantaneously supplied to the electrodes of the electrostatic precipitator, but is not so designed that such a current is continuously supplied. The reason for this is that the mean current over the on-load period plus the off-load period of the minimum length is smaller than 1000 mA. Thus, it is possible to decrease both the initial cost and the running cost of the electrostatic precipitator.

As is apparent from the above description, if the electrostatic precipitator is controlled in accordance with the method of the present invention, even high resistance dust particles can be effectively collected at an optimum duty ratio which is capable of substantially preventing back ionization in compliance with the dynamically varying condition of the electrostatic precipitator, particularly the change of the property of dust particles to be collected. In addition, the method of the present invention can be simply carried out without dependency upon experience, since only duty ratio is adjusted for preventing the back ionization.

In the method of the present invention, the parameter to be adjusted or settled is only one, i.e., the percent value (1 to 10%) by which the reference voltage is lowered for comparison with the detected bottom value to actually discriminate whether or not the back ionization occurs. As seen from FIGS. 6 to 11, however, the decrease of the bottom value caused by the back ionization has a substantial magnitude, and therefore it is not necessary to severely settle the percent value. In other words, adjustment is relatively easy in the control in accordance with the method of the present invention.

The invention has thus been shown and described with reference to specific embodiments. However, it should be noted that the invention is in no way limited to the details of the illustrated structures but changes and modifications may be made within the scope of the appended claims.

What is claimed is:

1. A method for controlling an electrostatic precipitator which includes discharging electrodes and collecting electrodes and which is supplied with a rectified secondary high voltage from a high voltage generating apparatus switchably connected to an AC source, said method comprising the steps of:
   applying a secondary voltage to the electrostatic precipitator in a duty cycle by alternating (i) an on-load period of connection to the AC source for a fixed time length corresponding to at least one cycle of the AC source, and (ii) an off-load period of adjustable time length, the secondary voltage having a series of peaks and valleys;
   providing at suitable intervals a compulsory off-load pause period, corresponding to at least 10 cycles of the AC source, to drop the secondary voltage;
   detecting the bottom value of a first valley in the secondary voltage in the first on-load period immediately after each compulsory pause period, said valley bottom being a reference voltage for back ionization detection;
   comparing the voltage at the bottom of an odd-numbered valley in the secondary voltage in each on-load period after the above compulsory pause period, a back ionization being detected if said compared bottom voltage is substantially less than the reference voltage; and
   adjusting the time length of the next off-load period by one cycle of the AC source on the basis of the determination made in said comparing step.

2. A method as claimed in claim 1 and the added step of adjusting the time length of the off-load period by elongating the next off-load period for one cycle of the AC source when the detected valley bottom voltage is lower than the reference voltage, and shortening the next off-load period for one cycle of the AC source when the detected valley bottom voltage is not lower than that of the reference voltage.

3. A method as claimed in claim 1 or 2 wherein the compulsory pause period is provided at least every 5 minutes.

4. A method as claimed in claim 3 wherein each on-load period has a fixed time length corresponding to two cycles of the AC source, and wherein the reference voltage for detecting the back ionization is a higher one of the first and third valley bottom values in the secondary voltage during the first on-load period just immediately after each compulsory pause period.

5. A method as claimed in claim 4 wherein the reference voltage for detecting the back ionization is the third valley bottom value in the secondary voltage during the first on-load period immediately after each compulsory pause period.

6. A method as claimed in claim 5 wherein the back ionization is detected when the valley bottom value is smaller than a level which is lower than the reference voltage for the back ionization by 1 to 10 percent of the reference voltage.

7. A method as claimed in claim 4 wherein the back ionization is detected when the valley bottom value is smaller than a level which is lower than the reference voltage for the back ionization by 1 to 10 percent of the reference voltage.

8. A method as claimed in claim 3 wherein the back ionization is detected when the valley bottom value is smaller than a level which is lower than the reference voltage for the back ionization by 1 to 10 percent of the reference voltage.

9. A method as claimed in claim 2 wherein each on-load period has a fixed time length corresponding to two cycles of the AC source, and wherein the reference voltage for detecting the back ionization is a higher one of the first and third valley bottom values in the secondary voltage during the first on-load period just immediately after each compulsory pause period.

10. A method as claimed in claim 9 wherein the reference voltage for detecting the back ionization is the third valley bottom value in the secondary voltage during the first on-load period immediately after each compulsory pause period.

11. A method as claimed in claim 10 wherein the back ionization is detected when the valley bottom value is smaller than a level which is lower than the reference voltage for the back ionization by 1 to 10 percent of the reference voltage.

12. A method as claimed in claim 9 wherein the back ionization is detected when the valley bottom value is smaller than a level which is lower than the reference voltage for the back ionization by 1 to 10 percent of the reference voltage.

13. A method as claimed in claim 2 wherein the back ionization is detected when the valley bottom value is smaller than a level which is lower than the reference voltage for the back ionization by 1 to 10 percent of the reference voltage.

14. A method as claimed in claim 1 wherein each on-load period has a fixed time length corresponding to two cycles of the AC source, and wherein the reference voltage for detecting the back ionization is a higher one of the first and third valley bottom values in the secondary voltage during the first on-load period immediately after each compulsory pause period.

15. A method as claimed in claim 14 wherein the reference voltage for detecting the back ionization is the third valley bottom value in the secondary voltage during the first on-load period immediately after each compulsory pause period.

16. A method as claimed in claim 15 wherein the back ionization is detected when the valley bottom value is smaller than a level which is lower than the reference voltage for the back ionization by 1 to 10 percent of the reference voltage.

17. A method as claimed in claim 14 wherein the back ionization is detected when the valley bottom value is smaller than a level which is lower than the reference voltage for the back ionization by 1 to 10 percent of the reference voltage.

18. A method as claimed in claim 1 wherein the back ionization is detected when the valley bottom value is smaller than a level which is lower than the reference voltage for the back ionization by 1 to 10 percent of the reference voltage.

* * * * *